United States Patent
Vermeir

(10) Patent No.: US 10,063,853 B2
(45) Date of Patent: Aug. 28, 2018

(54) EFFICIENT ERROR RECOVERY

(71) Applicant: BARCO N.V., Kortrijk (BE)

(72) Inventor: Thijs Koen Vermeir, Staden (BE)

(73) Assignee: BARCO N.V., Kortrijk (BE)

( * ) Notice: Subject to any disclaimer, the term of this patent is extended or adjusted under 35 U.S.C. 154(b) by 1029 days.

(21) Appl. No.: 14/107,257

(22) Filed: Dec. 16, 2013

(65) Prior Publication Data

US 2015/0172651 A1 Jun. 18, 2015

(51) Int. Cl.
| | | |
|---|---|---|
| *H04N 19/51* | (2014.01) | |
| *H04N 19/583* | (2014.01) | |
| *H04N 19/105* | (2014.01) | |
| *H04N 19/176* | (2014.01) | |
| *H04N 19/134* | (2014.01) | |
| *H04N 19/107* | (2014.01) | |
| *H04N 19/186* | (2014.01) | |
| *H04N 19/157* | (2014.01) | |
| *H04N 19/507* | (2014.01) | |
| *H04N 19/65* | (2014.01) | |

(52) U.S. Cl.
CPC ......... *H04N 19/105* (2014.11); *H04N 19/107* (2014.11); *H04N 19/134* (2014.11); *H04N 19/157* (2014.11); *H04N 19/176* (2014.11); *H04N 19/186* (2014.11); *H04N 19/507* (2014.11); *H04N 19/65* (2014.11)

(58) Field of Classification Search
CPC ....... H04N 19/00703; H04N 19/00733; H04N 19/105; H04N 19/176; H04N 19/134; H04N 19/65; H04N 19/186; H04N 19/157; H04N 19/507; H04N 19/107
USPC .................................................... 375/240.12
See application file for complete search history.

(56) References Cited

U.S. PATENT DOCUMENTS

| 6,025,888 A | 2/2000 | Pauls | |
|---|---|---|---|
| 6,108,378 A * | 8/2000 | Keesen | ................. G06T 7/2013 348/699 |
| 2003/0192062 A1* | 10/2003 | Kou | ..................... H04N 5/4401 725/141 |

(Continued)

FOREIGN PATENT DOCUMENTS

WO    2004/002150 A1    12/2003

OTHER PUBLICATIONS

Extended European Search Report and Written Opinion for corresponding Belgium Patent Application No. 201400012 dated Jan. 29, 2016.

*Primary Examiner* — Jay Patel
*Assistant Examiner* — Salame Amr
(74) *Attorney, Agent, or Firm* — Renner, Otto, Boisselle & Sklar, LLP

(57) ABSTRACT

The invention pertains to a method for a video encoder to select data from a set of image blocks, each block being associated with a frame, a counter value and a cost, the method comprising: calculating, for a target block from among said set of image blocks, the respective counter values and the respective costs of other blocks from among said set of image blocks, said other blocks being associated with the same frame as the target block or with a previous frame; and selecting from said other blocks a reference block having the lowest cost and counter value, according to predefined criteria. The invention also pertains to a computer program product for carrying out the method, and to a video encoder apparatus.

10 Claims, 9 Drawing Sheets

(56) References Cited

U.S. PATENT DOCUMENTS

| | | | |
|---|---|---|---|
| 2004/0141204 A1* | 7/2004 | Sakai | H04N 1/00352 358/1.16 |
| 2005/0105803 A1* | 5/2005 | Ray | G06F 17/30256 382/209 |
| 2006/0203916 A1* | 9/2006 | Chandramouly | H04N 19/176 375/240.24 |
| 2006/0228010 A1* | 10/2006 | Rubbert | A61C 7/00 382/128 |
| 2006/0291558 A1* | 12/2006 | Schreier | H04N 19/139 375/240.13 |
| 2007/0098074 A1* | 5/2007 | Kubota | H04N 19/176 375/240.16 |
| 2008/0247469 A1 | 10/2008 | Vadapalli et al. | |
| 2009/0010205 A1* | 1/2009 | Pratt, Jr. | G01D 21/00 370/328 |
| 2009/0016618 A1* | 1/2009 | Zhou | G06K 9/3266 382/232 |
| 2010/0128788 A1 | 5/2010 | Moccagatta et al. | |
| 2012/0051433 A1* | 3/2012 | Roji | H04N 19/61 375/240.16 |
| 2012/0170655 A1* | 7/2012 | Lee | H04N 19/527 375/240.16 |
| 2012/0215560 A1* | 8/2012 | Ofek | G06F 19/322 705/3 |
| 2013/0169880 A1* | 7/2013 | Ferguson | G06K 9/00718 348/607 |
| 2013/0343646 A1* | 12/2013 | Hata | G06K 9/4652 382/165 |

* cited by examiner

```
predictMacroblock MB
    checkCandidate MB:left, 0
    checkCandidate MB:up, 0
    checkCandidate MB:prev, 1
    checkCandidate NULL, 0
    MB.lifetime = bestLifetime
    encodeMBWithBestOption bestPeer checkCandidate peer, lifetimeOffset
    peerCost = cost (peer) # make estimate on using this prediction for encoding
    newLifetime = peer.lifetime + lifetimeOffset
    if newLifetime < MAX_LIFETIME
        if (peerCost < bestCost and (newLifetime < bestLifetime or !costAllowedByBandwith (bestCost,
lifetime, bestLifetime))) or
            (newLifetime < bestLifetime and costAllowedByBandwidth (peerCost, lifetime, newLifetime))
            bestCost = peerCost
            bestPeer = peer
            bestLifetime = newLifetime
```

Figure 5

EFFICIENT ERROR RECOVERY

BACKGROUND

The present invention relates to efficient error recovery in systems and methods dealing with encoded video streams as well as to an encoder and to software to carry out such methods when executed on a processing device, this software being stored on a non-transitory signal storing medium.

Compression is a method to reduce the size of a data set, in particular video data, so that it requires less bandwidth during transfer. The compressed data stream can be reconstructed by using various types of prediction. Conventionally, the data set is divided into I- and P-frames so that the I frames contain the actual compressed data while the P frames are predicted from the I frames. This concept was initially introduced to enable reading of local digital media without having to first decode the complete data set.

Today, large amounts of data are transferred via a network over imperfect channels and there is an increasing need for error recovery from network transmission errors. Applications with high quality demands, for example surveillance of industrial processes, traffic surveillance, digital operating rooms, audio applications, data compression or any other application with high demand of the streamed data quality, often uses lossless compression. Many such applications also require a refresh from artefacts within a certain maximum time limit.

Existing video codec standards (e.g. h.264, MPEG4, MPEG2, . . . ) support lossless compression in theory but their solutions for error recovery are complex and expensive. One example of this is given in U.S. Pat. No. 7,899,119, which discloses how to divide the image into regions and classifies them so that only the regions with significant information will use the complex error correction code.

SUMMARY

It is a goal of embodiments of the present invention to provide a simple error recovery method where it is possible to set the error recovery time upfront and adapt it to the displayed content.

According to an aspect of the present invention, there is provided a method for a video encoder to select data from a set of image blocks, each block being associated with a frame, a counter value and a cost, the method comprising: calculating, for a target block from among said set of image blocks, the respective counter values and the respective costs of other blocks from among said set of image blocks, said other blocks being associated with the same frame as the target block or with a previous frame; and selecting from said other blocks a reference block having the lowest cost and counter value, according to predefined criteria. The counter value, or lifetime, of a block may in particular represent the time since which the block has been relying on prediction, which thus corresponds to the maximum age of any artefact that may have intervened since the last unpredicted data update for that block. The counter value may be expressed as an elapsed time, a number of intervening frames, or any other suitable unit. This method gives a preference for selection of the blocks with the smallest (or at least smaller) counter values so that the data provided will be as new as possible. Each block may be associated with a particular position in the frame. The other blocks, which are considered for selection, are preferably adjacent blocks, i.e. blocks whose position in the frame is adjacent to the position of the target block, or the block that is in the same spatial position as the target frame in the previous block.

In an embodiment of the method according to the present invention, each block is associated with a maximum counter value so that selection can only take place with blocks not exceeding the maximum counter value. The maximum counter value means that it is possible to pre-set the maximum age of the data to be selected.

In an embodiment, the method according to the present invention further comprises using said reference block to predict data to transfer for said target block, or if no data passes the criteria, transferring unpredicted data for said reference block. If the maximum lifetime of all blocks is exceeded, the encoder should no longer use any block for prediction, but instead use the data as such (raw, compressed, . . . ) is transferred. The non-predicted information is the refresh of the data, thus if data is lost, it will be restored at this point. The interval of this refresh will be pre-set by the above mentioned lifetime.

In an embodiment of the method according to the present invention, the counter value of a block in a previous temporal position is increased by a number of counter units before calculating the counter value. This is how the counter value is increased.

In an embodiment of the method according to the present invention, the counter value units are frame counts. This is a suitable choice of counter when working with streaming of frames.

In an embodiment of the method according to the present invention, each of said other blocks is a block above or to the left of the target block or a counterpart of the target block in the previous frame. Instead of checking all neighbours, a selection is investigated.

In an embodiment of the method according to the present invention, the cost of a block is based on a number of colours in the block. In this way it is possible to give preference for selection of blocks with few colours or of many colours.

In an embodiment of the method according to the present invention, the counter value of a block is based on statistical data pertaining to network quality and bandwidth. This is a way to further adapt the method to the actual system by letting the counter units depend on the previous network performance.

In an embodiment of the method according to the present invention, the counter value for a block residing in a different frame is increased. In this way preference for selection will be given to blocks within the same frame.

According to an aspect of the present invention, there is provided a computer program product comprising code means configured to cause a processor to carry out the method as described above.

According to an aspect of the present invention, there is provided an apparatus comprising a first interface configured to receive a video signal, encoding means for encoding said video signal, and a second interface configured to transmit the encoded video signal, wherein said processing means is configured to select data from a set of image blocks, each block being associated with a frame, a counter value and a cost, and to calculate for a target block among said set of image blocks, the respective counter values and the respective costs of other blocks from among said set of image blocks, said other blocks being associated with the same frame as the target block or with a previous frame, and to select from said other blocks a reference block having the lowest cost and counter value, according to predefined criteria.

In an embodiment of the apparatus according to the present invention, said encoding means is further configured to use said reference block to predict data to transfer for said target block, and if no data passes the criteria, to transfer unpredicted data for said target block.

BRIEF DESCRIPTION OF DRAWINGS

These and other technical features and advantages of embodiments of the present invention will now be described in more detail with reference to the accompanying figures, in which:

FIG. 5 is an illustration of an embodiment of the present invention.

The drawings are schematic illustrations and non-limiting and should not be interpreted to represent an exact scale of the physical objects. The present invention is not limited to the disclosed embodiments. In the whole description, the same drawing numerals are used for the same elements of the present invention throughout the text. It should be understood that the term "comprising" used in the claims should not be interpreted as being restricted to the means listed thereafter, but should be interpreted as specifying the presence of the stated features and does not preclude the presence or additions of one or more features. Even though the text refers to video compression, there should be no limitation to use the present invention in other fields where fast error recovery is wished for.

DETAILED DESCRIPTION

Figure 1:
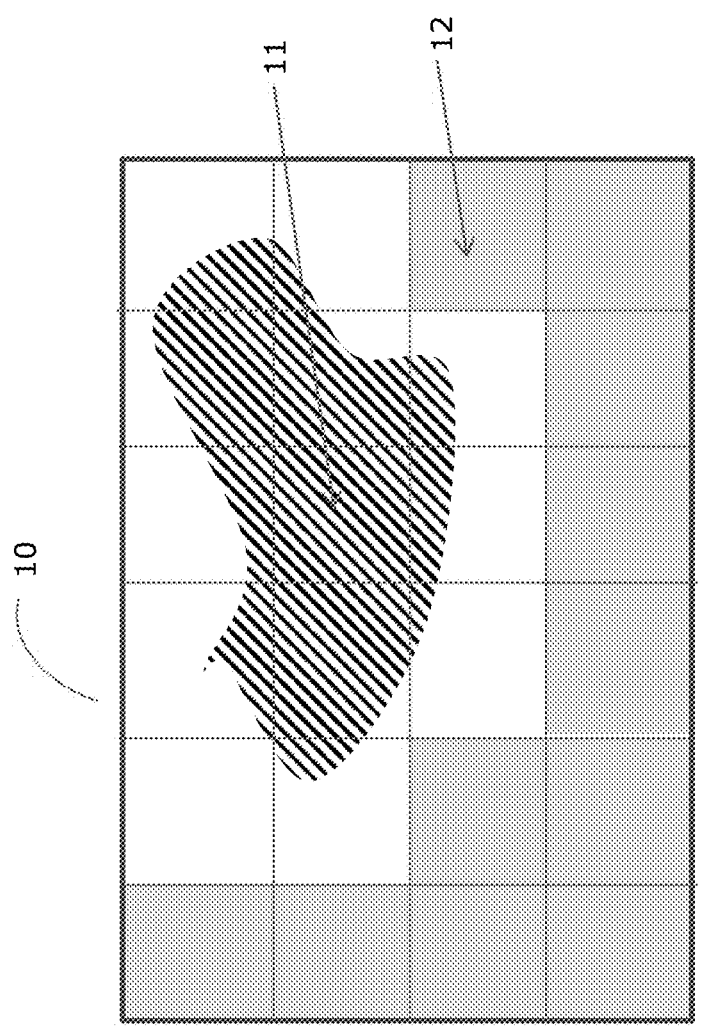
FIG. 1 is an illustration of a frame divided into macroblocks.

FIG. 1 shows an example of one embodiment of the invention. A frame 10 is subdivided into macroblocks, with different content. The diagonally striped areas here represent significance so that the significance of for example macroblock 11, is higher or lower than that of macroblock 12. A region of interest could be a collection of blocks which all contain similar type of content, such as the shaded macroblocks in FIG. 1. The blocks in FIG. 1 containing a striped pattern could together constitute another region of interest. This is a common situation for many applications where controlled error recovery is required. An example could be traffic surveillance where the constantly changing road would be one region of interest while the more static surrounding landscape could be another region of interest. With such a categorizing of blocks it is possible to associate all blocks of one region of interest with the same defined error recovery rate. A region with more critical information could then be given faster error recovery rate while a less important region of interest could have a slower error recovery rate. This is just an example and should not be seen as limiting for the invention.

Figure 2:
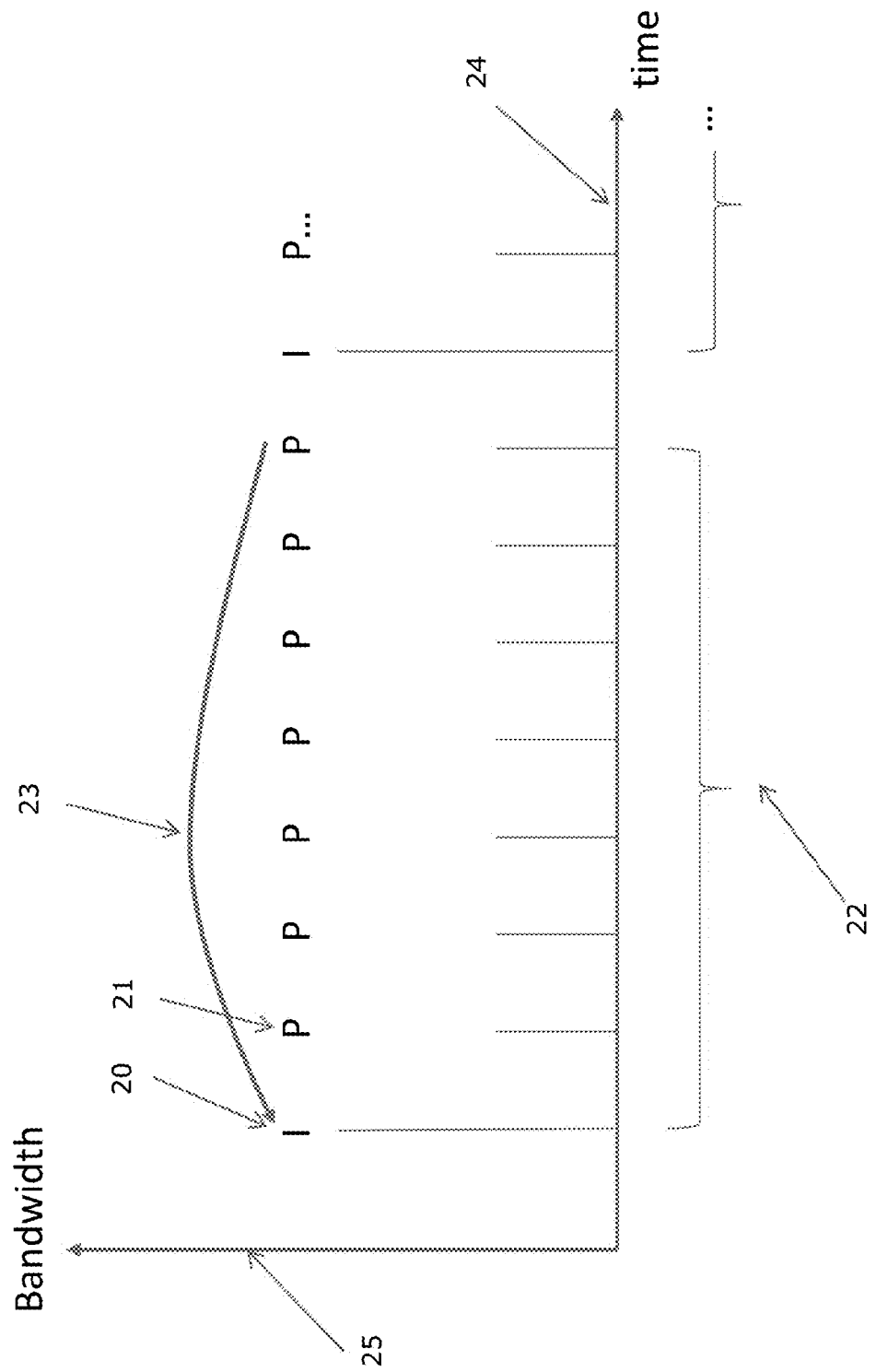
FIG. 2 is an illustration of a sequence of conventional I and P frames.

FIG. 2 shows a sequence of intra frames 20 called I, and predicted frames 21 called P, distributed along a time axis 24. The y-axis 25 shows the required bandwidth for each frame. The I frames 20 are transmitted in a non-predicted form (compressed, raw, . . . ) and are highly bandwidth consuming. Therefore it is of priority to decrease the presence of I frames. Since the bandwidth consumption is considerably larger than for the P frames, the overall operation will be characterized by a base level of low bandwidth use (the P frames) and then occasional spikes with very high bandwidth consumption (the I frames). This leads to an unstable operation that could endanger the robustness of the network performance.

The P frames 21 are predicted from the I frame of the same Group Of Pictures (GOP) 22. Since I frames use a lot of bandwidth, it is preferable to keep their frequency low. On the other hand this is also a limitation for the speed of error recovery. The arrow 23 indicates the longest possible time it would take to recover from an error in this example. In general, the error recovery rate can only be changed to one fixed interval and it does not consider the frame content.

Figure 3:
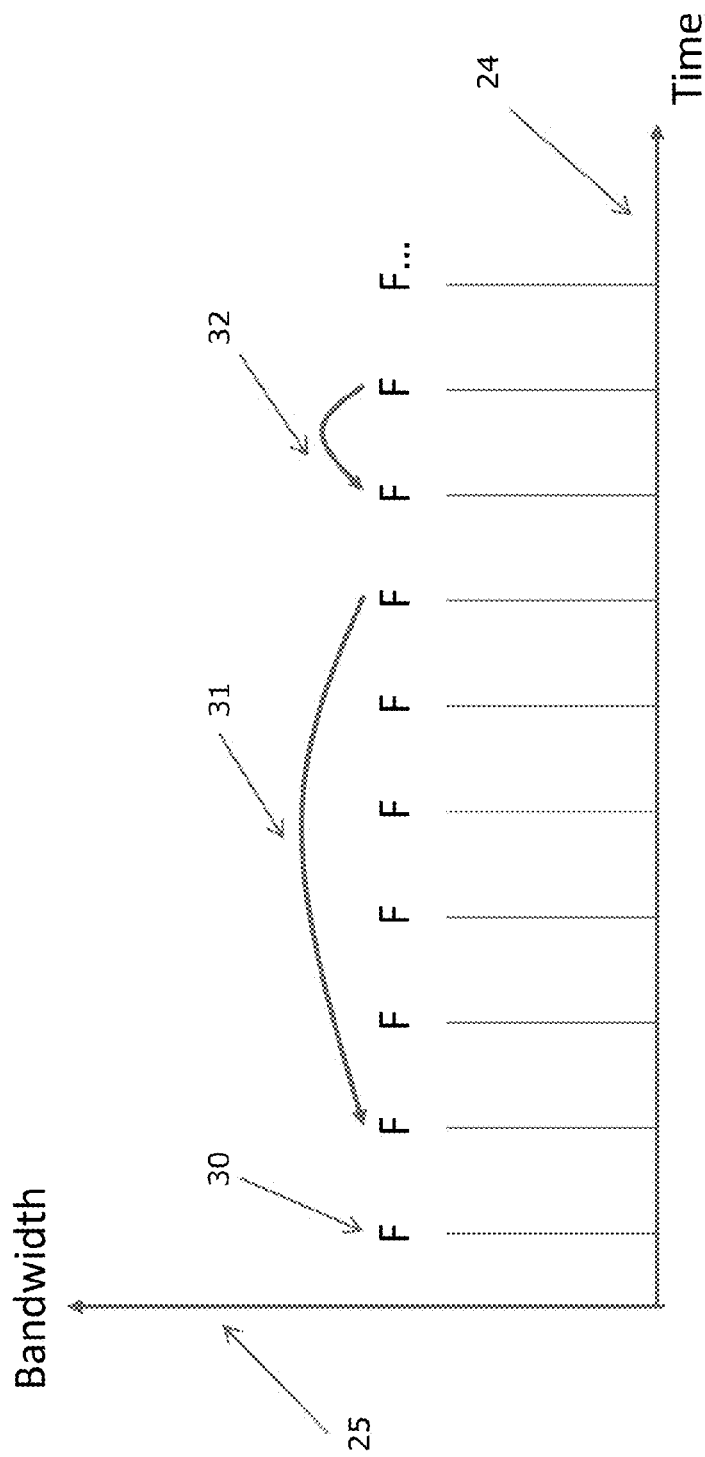
FIG. 3 is an illustration of a sequence of frames in an embodiment of the present invention.

FIG. 3 illustrates a sequence of frames according to an embodiment of the present invention. There is only one type of frames 30, here called F, distributed along the time axis 24. Their bandwidth consumption is shown on the bandwidth axis 25. The F frames consume in general somewhat more bandwidth than the P frames in FIG. 2, and less bandwidth than the I frames in FIG. 2. This is due to the fact that embodiments of the present invention no longer provide reference data by means of full I-frames but with individual I-blocks. The I-blocks are distributed over all F frames instead of being collected in specific I frames. This results in that the bandwidth consumption is smeared out to a stable value with no spikes.

The lifetime associated with the F frames is set to a maximum value, in view of a certain target bandwidth consumption. If there is still available bandwidth left, a block with higher cost but lower lifetime may be used in order to further decrease the lifetime. The invention does not necessarily accomplish a reduction of the overall average bandwidth use, but the advantage is a spike-free operation where the error recovery rate can be pre-set and furthermore it can be increased without requiring more bandwidth.

Figure 4:
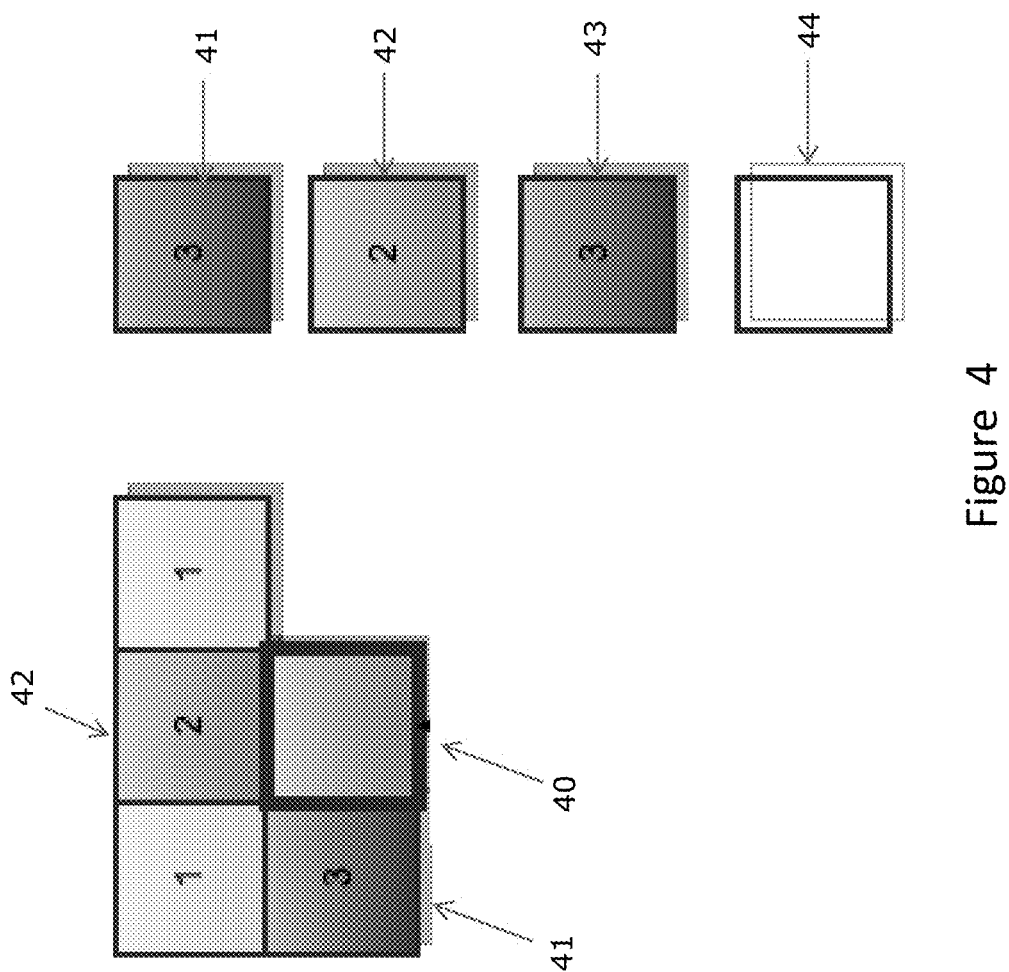
FIG. 4 is an illustration of an embodiment of the present invention.

FIG. 4 illustrates an example of an embodiment of the present invention where the adjacent (in space and time) blocks of a chosen block 40 are evaluated for cost and lifetime. This lifetime may in particular represent the time since which the block has been relying on prediction, which thus corresponds to the maximum age of any artefact that may have intervened since the last unpredicted data update for that block. The lifetime is indicated with a figure inside the blocks and the cost will depend on various factors, e.g. the colour of the blocks. In this example it is the colour of the adjacent block in relation with the current block examined that is of interest, e.g. if the colours are the same or not. For example, if a different colour means that additional information (compared to the chosen block 40) would have to be transferred, this would consume more bandwidth and an increased cost.

In the example of FIG. 4 it is the left 41, top 42 and previous 43 blocks that are evaluated for selection. In particular, this selection may be performed to determine an adjacent block on the basis of which block the chosen block 40 may be predictively encoded, or to determine that a "refresh" in the form of a transmission of the original data as received has become necessary. If none of these blocks are appropriate there is also the NULL alternative 44 available. If block 41 or 42 is chosen, block 40 gets the lifetime of the chosen block. If the block 43 from a previous frame is chosen, block 40 gets the lifetime of block 43+1 lifetime unit. In the case when all lifetimes of the adjacent blocks are too high, the block 40 can choose the NULL alternative. This would imply that there is no prediction performed but block 40 is transferred as received (raw, compressed or in any appropriate format). This means that the NULL operator always means a high cost since it consumes a large amount of bandwidth. If the NULL operator would be used, the lifetime of block 40 would be reset to its initial or lowest value.

Alternatively it could be possible to transmit the non-predicted data in case there is sufficient bandwidth available. In the example of FIG. 4 however, the block 42 will be chosen as predictor. It has the lowest lifetime and also the same colour as block 40, which would imply a lower cost than the different colour of block 41 or block 43.

In the example of FIG. 4 it is assumed that none of the adjacent lifetimes exceed the maximum allowed lifetime for block 40. The method in the presented example is sequential; an overview is shown in Table 1 which should be read from top to bottom. The first step is to evaluate the block 41 to the left of block 40 to be examined. Since its lifetime is within limits and it is the first choice, it will be provisionally selected. Then, the block 42 above block 40 is evaluated. Since it has lower life time and lower cost than the left block, it will replace the left block in the selection. The previous block 43 has a lifetime of 2, and since it is in the previous frame, one unit will be added. The cost of the previous block 43 is high since it has a different colour. Thus, it will have larger lifetime and higher cost than the currently selected block and will not be chosen. Since there exists a candidate within the maximum lifetime, the NULL operator will not be chosen.

TABLE 1

| Block | Lifetime | Cost | Selected |
|---|---|---|---|
| Left | 3 | High (different colour) | Yes |
| Above | 2 | Low (same colour) | Yes (replacing) |
| Previous (not shown) | 3 + 1 = 4 | High (different colour) | No |
| Null | NA | Very high (no prediction) | No |

The above example should not be seen as a limitation for the invention but a simplifying case to describe the evaluation principle.

FIG. 5 shows exemplary pseudo code of one embodiment of the present invention. The "checkCandidate" procedure comprises the rules for how the cost and lifetime are set for each adjacent block. The "predictMacroblock" procedure corresponds to parsing through the adjacent blocks according to the example of FIG. 4. FIGS. 6 to 9 show an illustration of an example of an embodiment of the present invention where all blocks of a frame containing 4 blocks are evaluated in 4 consecutive frames. In this presentation, it is more evident how parsing through all blocks of a frame impacts the outcome for the other blocks since their environment is constantly changing. This illustrates the ability of the invention to find the most appropriate candidate according to criteria of a system state in the very moment of evaluation. FIGS. 6, 7, 8 and 9 corresponds to frame 1, 2, 3 and 4 respectively.

Figure 6:
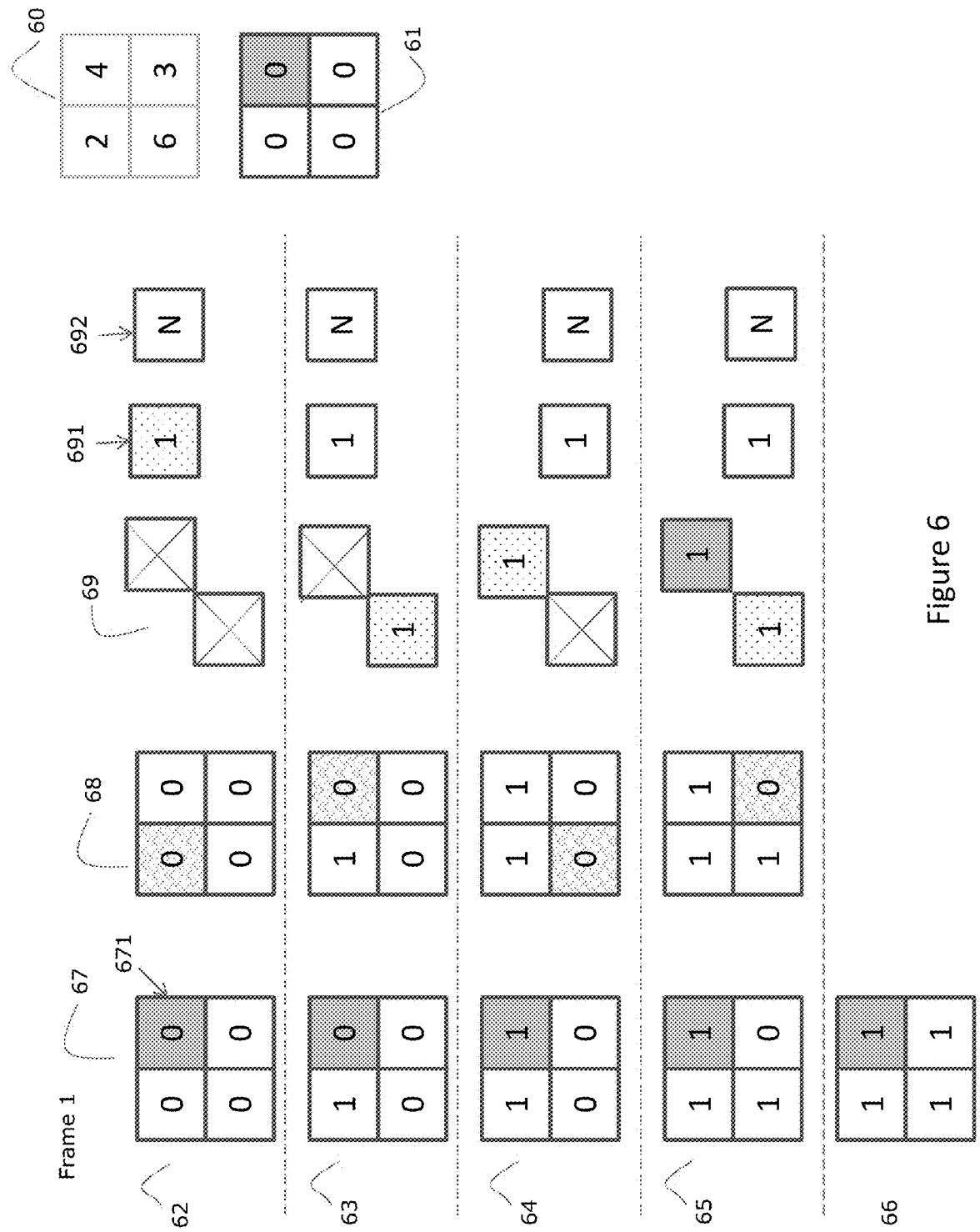
FIG. 6 is an illustration of an embodiment of the present invention.

FIGS. 6, 7, 8 and 9 are all built up with the same layout and FIG. 6 will serve as an illustrative example. Block 60 has the highest lifetime of the respective blocks in the frame. This corresponds in FIGS. 7, 8 and 9 to block 70, 80 and 90 respectively and so on. Block 61 is the state of the previous frame.

Row 60 to 65, separated with dashed lines, each represent an evaluation of a block. Row 66 is the final state when all blocks of frame 1 have been parsed through.

Starting with row 62, the first frame 67 shows the initial value of entering frame 1. Note that the upper right block 671 has another colour than the other blocks. The second frame 68 indicates with a checked pattern the block to be investigated in this row (here the upper left block). The blocks in 69 are the spatial adjacent neighbours to the left and above of the block to be investigated. If there are no such neighbours available, they are marked with a cross. Block 691 is the previous block at the same position as the block to be investigated, where the additional 1 unit has been added. Block 692 is the NULL operator. Among blocks 69, 691 and 692, the block to be selected is indicated with a dotted pattern.

The corresponding explanation applies to rows 63-65 in FIG. 6. The corresponding explanation of FIG. 6 also applies, mutatis mutandis, to FIGS. 7 to 9 of FIGS. 7 to 9.

In row 62, the first investigated block is that of the upper left corner, indicated in 68. Since there is no block to the left or above the selection, both blocks of 69 are indicated with a cross. The previous block 691 has a lifetime 1 (increase by 1 from 0 in 61). Since this is not exceeding the maximum lifetime 2, indicated in 60, 691 will be selected. This is indicated with the dotted pattern in 691. The NULL operator is associated with high bandwidth consumption and is assumed to have much higher cost than the predicted blocks and will in most cases not be chosen. There could however be an option to choose the NULL operator if there is available bandwidth. Row 63 shows how the updated state of the frame and the previous evaluated block (upper left corner) is now with the lifetime 1 of the predictor.

Figure 7:
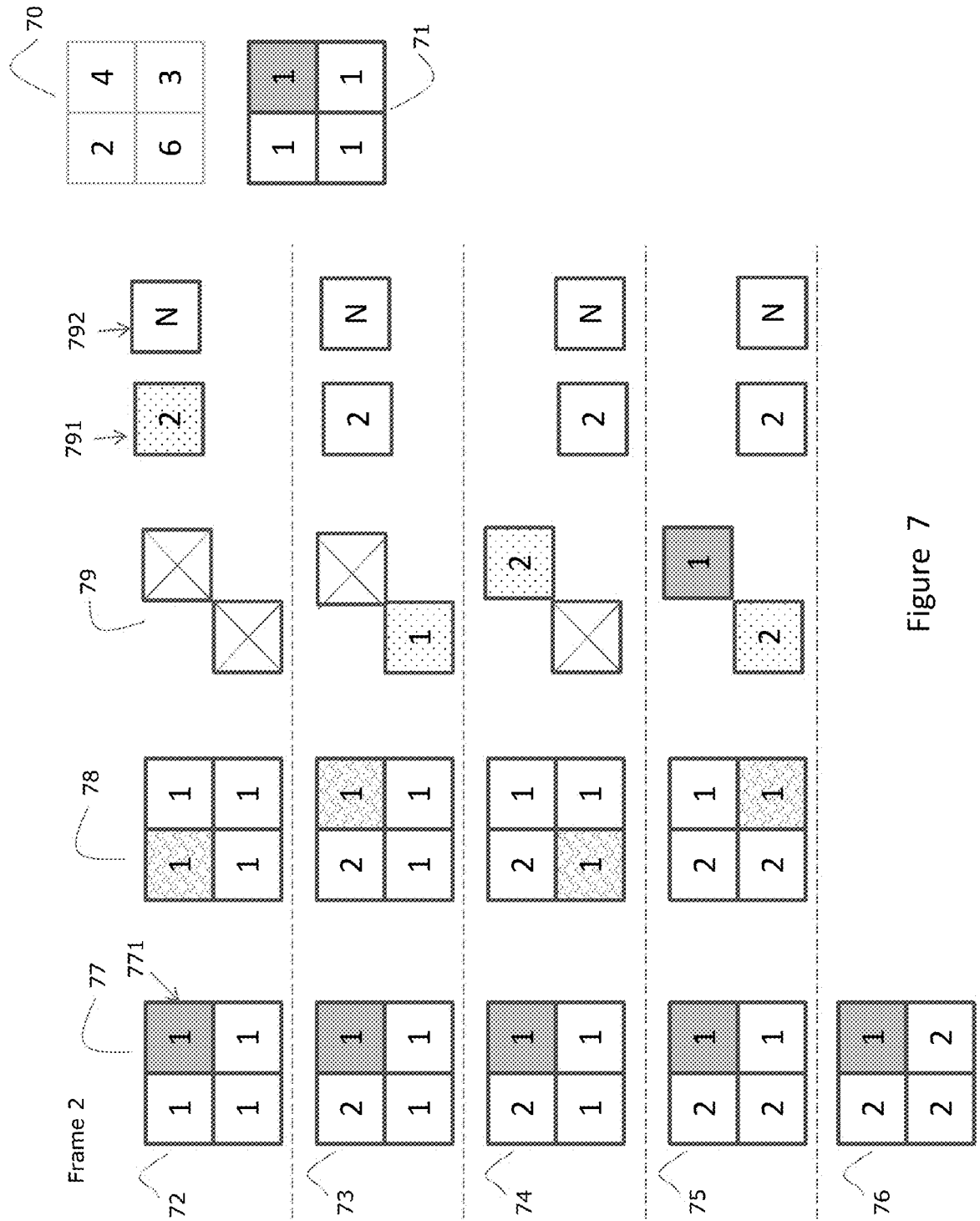
FIG. 7 is an illustration of an embodiment of the present invention.
Figure 8:
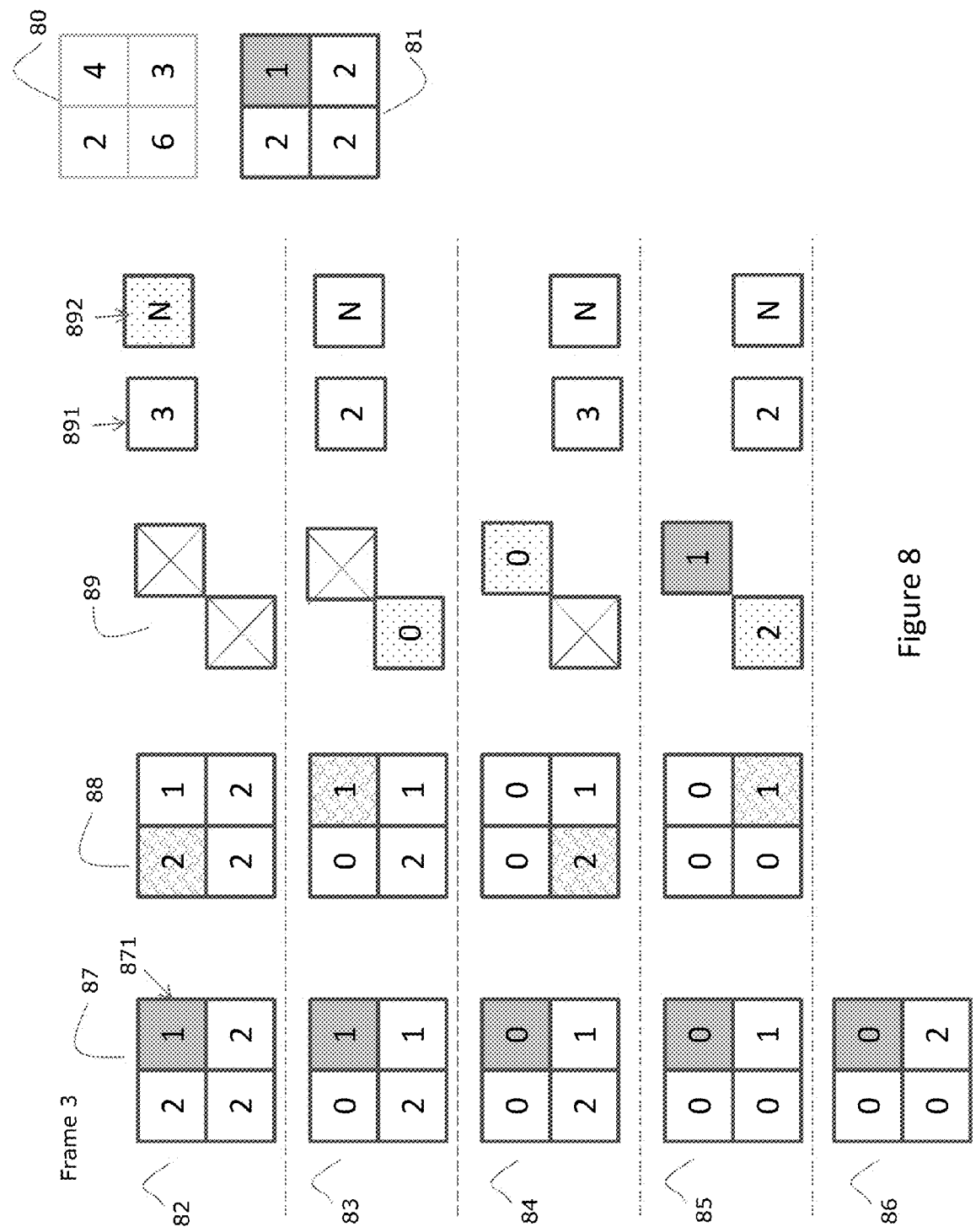
FIG. 8 is an illustration of an embodiment of the present invention.
Figure 9:
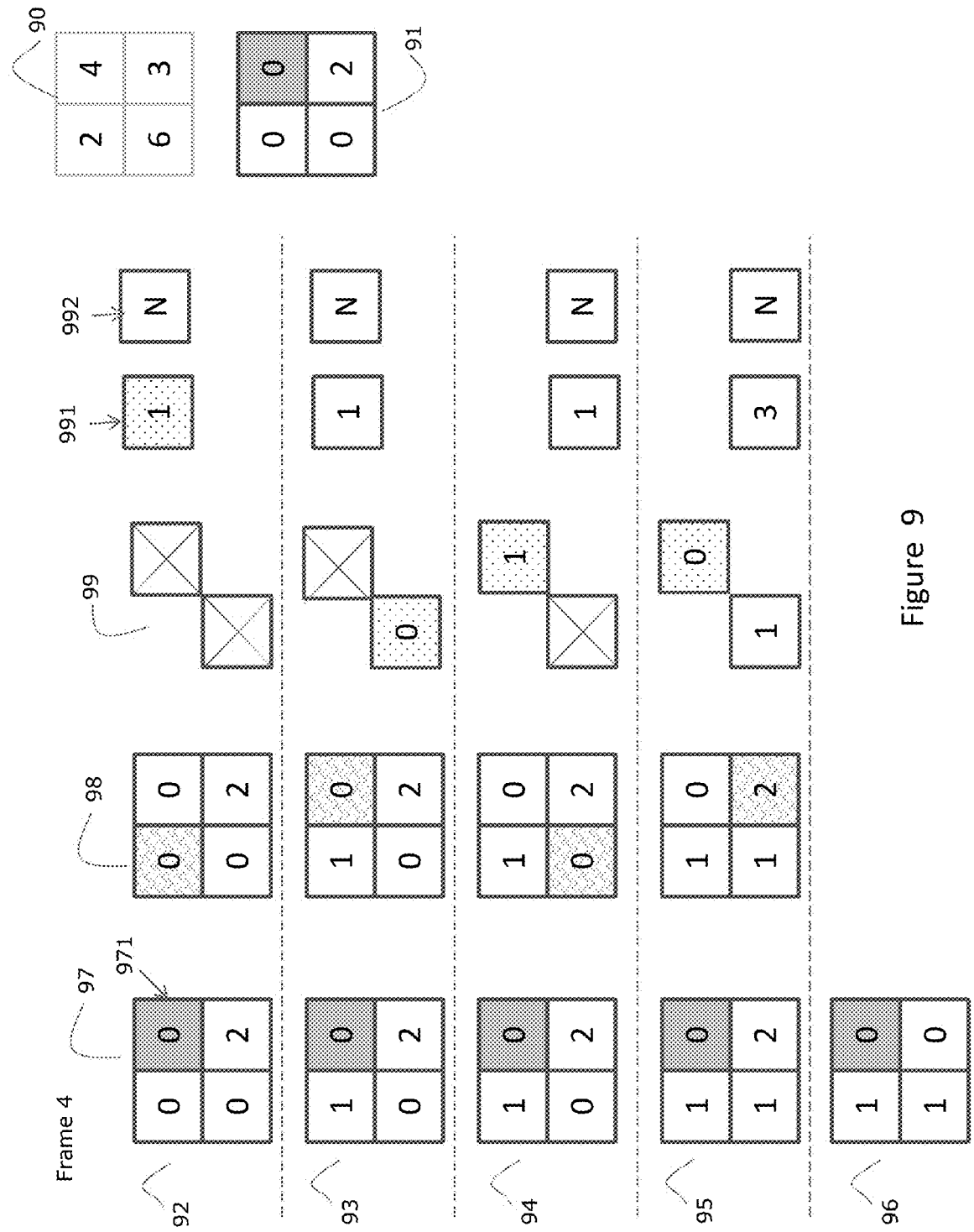
FIG. 9 is an illustration of an embodiment of the present invention.

Some special cases in FIGS. 6 to 9 will now be pointed out. When evaluating the coloured block in row 65 it is assumed that a different colour is too costly to choose, therefore it will be the left block that is chosen since lifetimes are equal. In FIG. 7 on row 75, it is assumed that the cost of the coloured block is so high that the left neighbour is chosen, even if it has a higher lifetime. This can be OK since the maximum lifetime (shown by 70 to be 6) has not been exceeded. In FIG. 8, row 82, the only available block 891 has a lifetime of 3. The block to be investigated is indicated in 88 to be the upper left block. This block has a maximum lifetime of 2 according to 80, thus it cannot be chosen and the selection will be the NULL operator 892. The first block of row 83 shows the updated state of the block; the upper left block evaluated in the previous step is now set to its initial value 0.

The various embodiments of the method according to the present invention may be implemented as a video encoder either free standing or embedded. Such a video encoder is an apparatus having a first interface configured to receive a video signal, encoding means for encoding said video signal, and a second interface configured to transmit the encoded video signal, wherein the processing means is configured to select data from a set of image blocks, each block being associated with a frame, a position, a counter value and a cost, and to calculate for each block the counter value of blocks in the same frame or in a previous frame and select the block having the lowest cost and counter value, according to predefined criteria.

Either or both of the interfaces may comprise a combination of hardware and software. The processing means is preferably adapted to communicate with the first and second interfaces.

The encoding means can be further configured to use said reference block to predict data to transfer for said target block, and if no data passes the criteria, to transfer unpredicted data for said target block.

The encoding means may in turn be implemented as a combination of one or more dedicated hardware components (such as ASICs), configurable logic components (such as FPGAs), or programmable components (such as microprocessors).

The present invention also pertains to a computer program product, optionally stored on a non-transitory computer-readable medium, comprising code means configured to cause a processor to carry out the methods as described above. In particular the present invention includes a computer program product comprising software having code segments which when executed on processor means provide a method for a video encoder to select data from a set of image blocks, each block being associated with a frame, a counter value and a cost. The software maybe adapted to provide, when executed on a processing means, means for calculating, for a target block from among said set of image blocks, the respective counter values and the respective costs of other blocks from among said set of image blocks. The software maybe adapted to provide, when executed on a processing means, that said other blocks are associated with the same frame as the target block or with a previous frame; and may select from said other blocks a reference block having the lowest cost and counter value, according to predefined criteria.

The software maybe adapted to provide, when executed on a processing means, that each block is associated with a maximum counter value so that selection can only take place with blocks not exceeding the maximum counter value.

The software maybe adapted to provide, when executed on a processing means, means for using said reference block to predict data to transfer for said target block, or if no data passes the criteria, to transfer unpredicted data for said reference block.

The software maybe adapted to provide, when executed on a processing means, that the counter value of a block in a previous temporal position is increased by a number of counter units before calculating the counter value.

The software maybe adapted to provide, when executed on a processing means, that the counter value units are frame counts.

The software maybe adapted to provide, when executed on a processing means, that each of said other blocks is a block above or to the left of the target block or a counterpart of the target block in the previous frame.

The software maybe adapted to provide, when executed on a processing means, that the cost of a block is based on a number of colours in the block.

The software maybe adapted to provide, when executed on a processing means, that the calculation of the counter value of a block is based on statistical data pertaining to network quality and bandwidth.

The software maybe adapted to provide, that the counter value for a block residing in a different frame is increased.

The computer program product mentioned above may be stored on a non-transitory signal storage medium such as a solid state memory such as a flash memory or USB memory, a magnetic hard disk, a magnetic tape, an optical storage medium such as a CD-ROM or a DVD-ROM, etc. The non-transitory signal storage means is preferably computer or machine readable.

While the invention has been described herein with reference to specific embodiments, this is done to illustrate and not to limit the invention, the full scope of which is defined by the accompanying claims.

The invention claimed is:

1. A method for a video encoder to encode data from a set of image blocks, each block being associated with a frame, a counter value and a cost, the method comprising:
    for a target block of the set of image blocks, calculating the respective counter values and the respective costs of other blocks from among said set of image blocks, wherein:
        said other blocks are associated with the same frame as the target block or with a previous frame; and
        said other blocks neighbor the target block or are located in a same position as the target block in the previous frame;
    when at least one of said other blocks satisfies a predetermined criteria:
        selecting from the other blocks a reference block having the lowest cost and counter value according to the predefined criteria;
        encoding predicted data for the target block based on the reference block;
    when at least one of said other blocks does not satisfy the predefined criteria, encoding unpredicted data for the target block;
    wherein transferring the encoded predicted data for the target block consumes less bandwidth than transferring the unpredicted data for the target block.

2. The method of claim 1 wherein each block is associated with a maximum counter value and the predefined criteria for selecting the reference block limits the selection to blocks not exceeding the maximum counter value.

3. The method of claim 1, wherein the counter value of a block in a previous temporal position is increased by a number of counter units before calculating the counter value.

4. The method of claim 1, wherein the counter value units are frame counts.

5. The method of claim 1, wherein each of said other blocks is a block above or to the left of the target block or a counterpart of the target block in the previous frame.

6. The method of claim 1, wherein the cost of a block is based on a number of colours in the block.

7. The method of claim 1, wherein the calculation of the counter value of a block is based on statistical data pertaining to network quality and bandwidth.

8. The method of claim 1, wherein the counter value for a block residing in a different frame is increased.

9. A computer program product comprising code stored on a non-transitory computer readable medium, the code configured to cause circuitry to carry out the method according to claim 1.

10. An apparatus comprising:
    circuitry configured to:
        receive a video signal including image blocks;
        select data from a set of the image blocks, each block being associated with a frame of the video signal, a counter value and a cost;

for a target block of the set of image blocks, calculate the respective counter values and the respective costs of other blocks from among said set of image blocks, wherein:
  said other blocks are associated with the same frame as the target block or with a previous frame; and
  said other blocks neighbor the target block or are located in a same position as the target block in the previous frame;
when at least one of said other blocks satisfies a predefined criteria:
  select from the other blocks a reference block having the lowest cost and counter value according to the predefined criteria
  encode predicted data for the target block based on the reference block; and
  transmit the encoded video signal including the encoded predicted data; and
when at least one of said other blocks does not satisfy the predefined criteria:
  encode unpredicted data for the target block; and
  transmit the encoded video signal including the encoded unpredicted data;
wherein transmitting the encoded predicted data for the target block consumes less bandwidth than transferring the encoded unpredicted data for the target block.

* * * * *